A. F. FAIRCHILD.
WHEEL TIRE.
APPLICATION FILED OCT. 15, 1918.

1,317,010.

Patented Sept. 23, 1919.

Inventor
Alson F. Fairchild
By J. M. St. John
Atty.

UNITED STATES PATENT OFFICE.

ALSON F. FAIRCHILD, OF DELAVAN, WISCONSIN.

WHEEL-TIRE.

1,317,010.     Specification of Letters Patent.     Patented Sept. 23, 1919.

Application filed October 15, 1918. Serial No. 258,206.

*To all whom it may concern:*

Be it known that I, ALSON F. FAIRCHILD, a citizen of the United States, residing at Delavan, in the county of Walworth and State of Wisconsin, have invented certain new and useful Improvements in Wheel-Tires; and I do hereby declare the following to be a full, clear, and exact description of the invention, such as will enable others skilled in the art to which it appertains to make and use the same.

This invention relates to wheel tires, and has for its object to improve the construction of such tires so as to secure the advantages pertaining to both pneumatic and solid rubber tires, without the danger of puncture to which pneumatic tires are subject.

Figure 1:
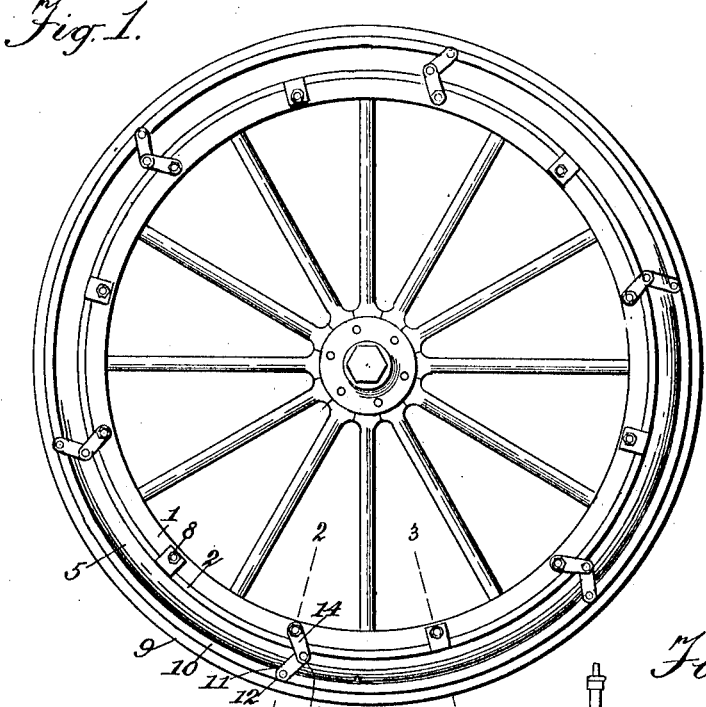
Figure 2:
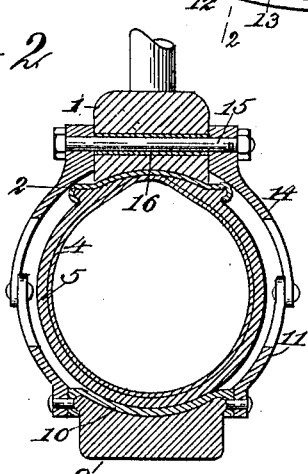
Figure 3:
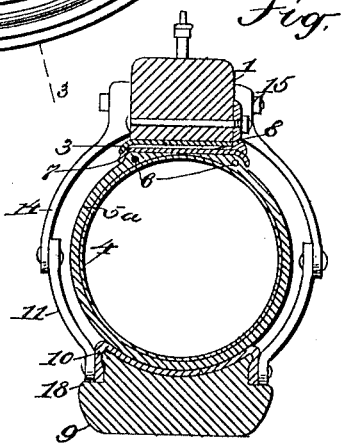
Figure 4:
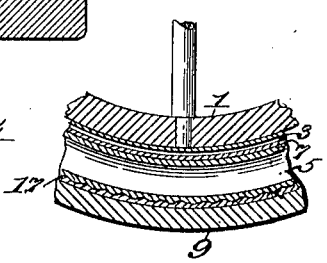

The nature of the invention is fully disclosed in the description and claims following, reference being had to the accompanying drawing, in which:

Figure 1 is a side elevation of a tire embodying my improvements. Fig. 2 is a cross section of the same, but with a somewhat different type of attachment, in the line 2—2 of Fig. 1, looking toward the right. Fig. 3 is a section of the tire and its connections, as shown in Fig. 1, in the line 3—3, looking toward the left. Fig. 4 is a section of the same in a central, circumferential plane.

In the drawing, the numeral 1 denotes a wheel-felly, provided with a pneumatic tire-retaining rim 2 or 3, the former of the clencher, and the latter of the quick-detachable type. To the clencher rim is attached a pneumatic tire, comprising the usual inner tube 4 and an outer casing 5. In the case of the quick-detachable type, shown in Fig. 3, the casing 5ª is of the straight-side kind, supplied with the usual cables at 6, and is seated in a supplemental and removable rim 7, held in place in the usual way, by clips 8. The construction so far does not differ essentially from that in general use, except that the casing may be composed of a number of plies of strong canvas, and merely enough rubber to bind them well together, and coat them outwardly as a protection against the elements. No extra thickness of rubber need be provided for the circumferential portion, since this is never exposed to the friction and abrasion of the road. A great economy is thus effected in the construction of the pneumatic part of the tire, while all its resiliency is retained.

The tread of the wheel is borne by a tire of solid rubber 9, seated in a suitable retaining rim 10, which conforms internally to the curvature of the pneumatic tire, and gives it a firm, well fitting seat. To prevent lateral displacement by skidding, more especially if the pneumatic tire be insufficiently inflated, the rim which holds the solid tire is anchored adjustably to the felly by suitable guides. These are preferably pairs of links 11 hinged to the rim at 12, and pivotally connecting at 13 with other pairs of links 14 hinged to the felly, the links being long enough to form angled knee-joints at all times, as shown in Fig. 1, so that they may play freely to allow for the necessary radial motion of the outer tire member in use. In practice the links 14 may be bolted together at 15 to form a stirrup, the bearing of the stirrup in the felly being a spacing-tube 16, through which the bolt passes. This gives freedom of movement to the tire radially, but prevents any lateral displacement when the wheel is subjected to side-strains, as in rounding curves, and the like.

To prevent any circumferential slippage of the outer rim on the pneumatic tire, the adjoining surfaces of each should be transversely corrugated, as shown in Fig. 4 at 17. This gives the traction part of the tire a proper grip on the wheel, through the pneumatic tire, and avoids any possible shifting in the proper positions of the link guides.

Referring to Fig. 3 it will be seen that the solid tire is expanded at 18, mainly as a protection to the outer joints of the guide-links, but also giving further protection to the pneumatic tire against punctures.

The outer tire is easily removed by unbolting the links connecting with the felly, and deflating the pneumatic tire. The latter may then be detached in the usual way.

Having thus described my invention, I claim:

A wheel-tire, comprising a pneumatic tire, a retaining rim connecting the same with the felly, an outer rim seated on the pneumatic tire, a solid tire held thereby, and a series of knee-jointed guide-links connecting the outer rim and the felly outside the tire.

In testimony whereof I affix my signature in presence of two witnesses.

ALSON F. FAIRCHILD.

Witnesses:
C. H. SHULZ,
EFFIE B. CRANE.

Copies of this patent may be obtained for five cents each, by addressing the "Commissioner of Patents, Washington, D. C."